United States Patent [19]

Hendriks et al.

[11] 4,427,401

[45] Jan. 24, 1984

[54] COMPOSITE DRIVING BELT WITH TRANSVERSE AND INTERMEDIATE ELEMENTS

[75] Inventors: Emerie F. M. Hendriks, Heeze; Theodorus P. M. Cadée, Goirle, both of Netherlands

[73] Assignee: Van Doorne's Transmissie B.V., Tilburg, Netherlands

[21] Appl. No.: 191,817

[22] Filed: Sep. 26, 1980

[30] Foreign Application Priority Data

Sep. 27, 1979 [NL] Netherlands .......................... 7907181

[51] Int. Cl.³ .............................................. F16G 5/16
[52] U.S. Cl. ...................................... 474/201; 474/242
[58] Field of Search ............... 474/201, 240, 242, 244, 474/272

[56] References Cited

U.S. PATENT DOCUMENTS

| | | | |
|---|---|---|---|
| 962,563 | 6/1910 | Foster et al. | 474/201 |
| 1,264,193 | 4/1918 | Leonard | 474/242 |
| 3,720,113 | 3/1973 | Van Doorne et al. | 474/242 |
| 3,949,621 | 4/1976 | Beusink | 474/201 |
| 4,080,841 | 3/1978 | Vollers | 474/201 |

FOREIGN PATENT DOCUMENTS

| | | | |
|---|---|---|---|
| 802 | 2/1979 | European Pat. Off. | 474/201 |
| 2414989 | 10/1975 | Fed. Rep. of Germany | 474/201 |
| 256918 | 9/1948 | Switzerland | 474/201 |
| 5052 | of 1886 | United Kingdom | 474/242 |

*Primary Examiner*—Lawrence J. Staab
*Attorney, Agent, or Firm*—Cushman, Darby & Cushman

[57] ABSTRACT

A V-belt comprising an endless flexible carrier provided with a plurality of substantially non-deformable transverse elements which are arranged slidably on the endless carrier and a plurality of intermediate elements disposed between the flanks of the endless carrier and the transverse elements so that the flanks do not contact the transverse elements, said intermediate elements extending longitudinally along more than one transverse element.

5 Claims, 5 Drawing Figures

U.S. Patent      Jan. 24, 1984      4,427,401
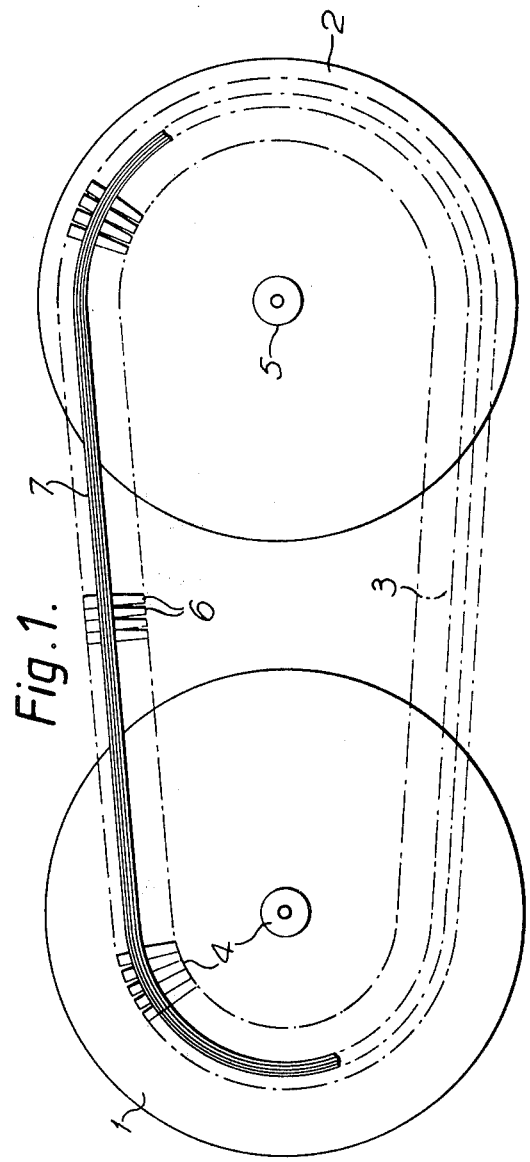
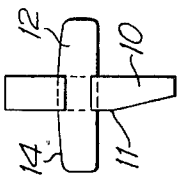
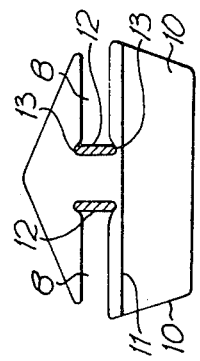
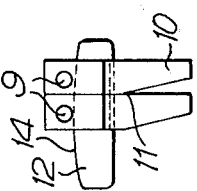
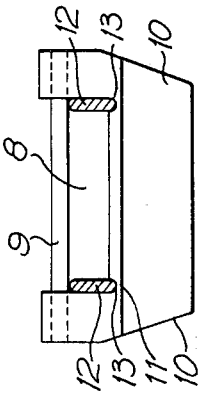

COMPOSITE DRIVING BELT WITH TRANSVERSE AND INTERMEDIATE ELEMENTS

This invention relates to a composite endless driving belt of the kind constructed of a plurality of plate-like elements arranged in face-to-face abutting relationship and transversely mounted on an endless carrier.

BACKGROUND

U.S. Pat. No. 4,080,841 discloses a driving belt of substantially trapezoid-shaped cross-section for use with pulleys having V-shaped grooves, the belt being constructed of an endless flexible carrier in the form of at least one metal band on which are slidably mounted a plurality of plate-like substantially non-deformable metal elements each disposed transverse to the carrier and each being in face-to-face contact with the two adjacent elements. One face at the inner end portion of each element is bevelled or tapered away from the adjacent element for enabling the bending of the driving belt whereby each transverse element contacts each adjacent element along a tilting line which is located where the bevel merges into a surface which is parallel to the opposite face.

Such a V-belt may be used for the transmission of a relatively large torque between two pulleys, each pulley being constructed of two conical discs which have a mutually variable distance between them in order to achieve a transmission with a stepless variable transmission ratio.

Since the transverse elements are arranged slidably on the carrier, i.e. with some clearance, the transverse elements have a slight sliding possibility in transverse direction, both relative to the carrier and relative to each other. If the transverse elements, during operation, make impact with the carrier, the carrier or the transverse element may be damaged thereby.

SUMMARY OF THE INVENTION

It is the object of the present invention to provide for a degree of mutual coupling of the transverse elements to each other so as to prevent the endless band or bands of the carrier from being damaged.

To this end the V-belt according to the invention has intermediate elements between the flanks (side edge portions) of the endless band or bands and the transverse elements, the intermediate elements extending longitudinally along more than one transverse element. As a result the side edge portions of the endless band or bands of the carrier cannot contact the transverse elements. They can, however, run against the intermediate elements, and this is not inconvenient since the intermediate elements have a large and flat surface for this purpose. Moreover, the intermediate elements effect a mutual coupling between the transverse elements for avoiding a lateral displacement of the transverse elements. This is the result of the fact that the intermediate elements have a greater length than the thickness of a transverse element so that each intermediate element extends over more than one transverse element. Preferably, the intermediate elements have a greater length than twice the thickness of one transverse element.

In a preferred embodiment the intermediate elements consist of substantially rectangular plates, a right angle side of which being convexly curved, in order to enable the bending of the V-belt.

According to a further feature of the invention the intermediate elements extend in recesses of the transverse elements disposed longitudinally to the V-belt, which enhances the guidance of the intermediate elements and the mutual coupling of the transverse elements.

BRIEF DESCRIPTION OF THE DRAWING

FIG. 1 is a schematic cross-sectional illustration of two pulleys and a V-belt which embodies the present invention;

FIG. 2 is a front view of a transverse belt element;

FIG. 3 is a side view of two of such transverse elements;

FIG. 4 is a front view of a somewhat different transverse element; and

FIG. 5 is a side view of the element of FIG. 4.

DETAILED DESCRIPTION

FIG. 1 illustrates a V-belt 3 and two V pulleys 1 and 2 each of which is constructed of two coaxial conical discs mounted on a shaft 4 or 5. The distance between the discs of each pulley can be controlled to thereby vary the running diameter of the respective pulley. As a result the ratio between the rotational speeds of the shafts 4 and 5 can be varied over a wide range in a stepless manner.

The V-belt 3 comprises a plurality of transverse elements 6 which are made of substantially non-deformable material and arranged slidably on the endless carrier 7. The carrier 7 may be a single band or several overlying bands. One face of each transverse element 6 is slightly tapered inwardly, so that the V-belt can bend in one direction, whereby the transverse elements 6 can find support against each other through a roll-off zone or tilting line 11. Substantially the entire length of the carrier 7 is provided with transverse elements 6.

The transverse element shown in FIG. 2 is provided with a single recess 8 which receives the carrier 7 which in this embodiment is formed of a plurality of overlying endless bands. A metal pin 9 prevents the transverse element 6 from falling off the carrier 7 and is inserted after the transverse element 6 has been placed on the carrier 7. The transverse element 6 has two oblique faces 10 which come into contact with the conical discs of the pulleys 1 and 2. The transverse element 6 is tapered downwardly (in FIG. 2) from the roll-off zone or tilting line 11, so that abutting transverse elements 6 can slightly tilt relative to each other in order to enable the bending of the V-belt.

According to the present invention there are provided intermediate elements 12 which form an intermediary between the side edge portions or flanks of the carrier 7 which is disposed in the recess 8. The intermediate elements 12 engage at their bottom edge in grooves 13 in the transverse element 6. Since the intermediate elements 12 extend longitudinally over a plurality of transverse elements 6, a mutual displacement of the transverse elements in transverse direction of the V-belt is avoided, or at least restricted. The flanks of the carrier 7 do not contact the transverse elements 6 but they can contact the intermediate elements 12. The elements 12 can be made of metal.

FIG. 3 shows a side view of two transverse elements 6 according to FIG. 2. Since the upper edge 14 of each intermediate element 12 is convexly curved, the transverse elements 6 may tilt relative to each other about the tilting line 11 without this being impeded in that the pin 9 touches the intermediate element 12. The intermediate elements 12 have such a length that they extend over a plurality of transverse elements.

In the embodiment of FIGS. 4 and 5 the transverse element 6a is adapted for use with a carrier which comprises two side-by-side endless bands. To this effect, two lateral recesses 8a are present. In this embodiment both the top and bottom edges of the intermediate elements 12a engage in grooves 13a.

Each intermediate element 12a may be fixedly connected to or clampingly disposed in one transverse element 6a and extend slidably in other transverse elements 6a. It is also possible to provide clearance between the intermediate elements 12a and the transverse elements 6a.

What is claimed is:

1. A V-belt comprising an endless flexible carrier having side edges, a plurality of substantially non-deformable transverse elements arranged slidably on the endless carrier, said transverse elements having side edges facing the side edges of the carrier; and a plurality of intermediate elements distinct from the carrier and from the transverse elements and disposed between said side edges of the endless carrier and said side edges of the transverse elements so that said side edges of the carrier do not contact the transverse elements, said intermediate elements extending longitudinally along more than one transverse element and consisting of substantially rectangular plates, a face of which is convexly curved.

2. A V-belt comprising: an endless flexible carrier having an inwardly facing surface, an outwardly facing surface and two laterally facing side edges; a plurality of substantially non-deformable transverse elements arranged slidably on said carrier; and a plurality of intermediate elements disposed along the length of the endless carrier in locations between the side edges of the endless carrier and the transverse elements so that the side edges of the carrier do not contact the transverse elements, each intermediate element extending longitudinally along more than one transverse element and being connected to at least one of the respective transverse elements.

3. A V-belt comprising: an endless flexible carrier having side edges; a plurality of substantially non-deformable transverse elements which are arranged slidably on the endless carrier; and a plurality of intermediate elements disposed along the length of the endless carrier in locations between the side edges of the endless carrier and the transverse elements so that the side edges of the carrier do not contact the transverse elements, each intermediate element comprising substantially rectangular plates, a face of which is convexly curved, said intermediate elements extending longitudinally along more than one transverse element.

4. A V-belt comprising an endless flexible carrier provided with a plurality of substantially non-deformable transverse elements which are arranged slidably on the endless carrier and a plurality of intermediate elements disposed along the length of the endless carrier in locations between the side edges of the endless carrier and the transverse elements so that the side edges of the carrier do not contact the transverse elements, each intermediate element extending longitudinally along more than one transverse element in recesses in the transverse element disposed in the longitudinal direction to the V-belt.

5. A V-belt comprising an endless flexible carrier having side edges, a plurality of substantially non-deformable transverse elements arranged slidably on the endless carrier, said transverse elements having side edges facing the side edges of the carrier; and a plurality of intermediate elements distinct from the carrier and from the transverse elements and disposed between said side edges of the endless carrier and said side edges of the transverse elements so that said side edges of the carrier do not contact the transverse elements, said intermediate elements extending longitudinally along more than one transverse element and extending in recesses in the transverse elements disposed in the longitudinal direction to the V-belt.

* * * * *